(12) United States Patent
Braun et al.

(10) Patent No.: US 8,431,675 B2
(45) Date of Patent: Apr. 30, 2013

(54) CURABLE COMPOUND COMPRISING SILYLATED POLYURETHANE

(75) Inventors: Daniela Braun, Shanghai (CN); Johann Klein, Duesseldorf (DE); Christiane Kunze, Cologne (DE); Sara Gonzalez, Barcelona (ES); Lars Zander, Rommerskirchen (DE); Andreas Bolte, Duesseldorf (DE); Helene Boudet, Duesseldorf (DE); Sarah Schulz, Wülfrath (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 280 days.

(21) Appl. No.: 12/791,974

(22) Filed: Jun. 2, 2010

(65) Prior Publication Data

US 2010/0280209 A1  Nov. 4, 2010

Related U.S. Application Data

(63) Continuation of application No. PCT/EP2008/066630, filed on Dec. 2, 2008.

(30) Foreign Application Priority Data

Dec. 4, 2007 (DE) .......................... 10 2007 058 483

(51) Int. Cl.
*C08G 77/04* (2006.01)
(52) U.S. Cl.
USPC .......................................................... 528/85
(58) Field of Classification Search ............ 528/85, 528/28
See application file for complete search history.

(56) References Cited

U.S. PATENT DOCUMENTS

| | | | |
|---|---|---|---|
| 3,632,557 A | 1/1972 | Brode et al. | |
| 3,971,751 A | 7/1976 | Isayama et al. | |
| 3,979,344 A | 9/1976 | Bryant et al. | |
| 4,222,925 A | 9/1980 | Bryant et al. | |
| 4,960,844 A | 10/1990 | Singh | |
| 5,525,654 A | 6/1996 | Podola et al. | |
| 5,990,257 A | 11/1999 | Johnston et al. | |
| 6,124,387 A | 9/2000 | Wang et al. | |
| 7,332,541 B2 | 2/2008 | Schindler et al. | |
| 7,357,960 B2 | 4/2008 | Stanjek et al. | |
| 2004/0180155 A1* | 9/2004 | Nguyen-Misra et al. | ....... 428/34 |
| 2007/0055035 A1 | 3/2007 | Ludewig et al. | |

FOREIGN PATENT DOCUMENTS

| | | |
|---|---|---|
| DE | 4029504 | 3/1992 |
| DE | 19849817 | 5/2000 |
| DE | 10237270 | 3/2004 |
| DE | 10237271 | 3/2004 |
| DE | 102005041953 | 3/2007 |
| EP | 070475 | 1/1983 |
| EP | 370464 | 5/1990 |
| EP | 0520426 | 12/1992 |
| EP | 601021 | 7/1994 |
| EP | 0931800 | 7/1999 |
| WO | WO 92/05212 | 4/1992 |
| WO | WO 03/066701 | 8/2003 |
| WO | WO 2005/042605 | 5/2005 |
| WO | WO 2007/050426 | 5/2007 |
| WO | WO 2008/027499 | 3/2008 |
| WO | WO 2008/036364 | 3/2008 |

OTHER PUBLICATIONS

Search Report from International Application No. PCT/EP2008/066630 dated Apr. 6, 2009.
DIN EN 27389.
DIN EN 28339.

* cited by examiner

*Primary Examiner* — Kuo-Liang Peng
(74) *Attorney, Agent, or Firm* — Steven C. Bauman; James E. Piotrowski

(57) ABSTRACT

A method for producing a silylated polyurethane including the steps: (A) converting (i) at least polyol compound having a molecular weight of 4,000-30,000 g/mol and at least one monofunctional compound relative to isocyanates and (ii) at least one diisocyanate at a stoichiometric excess of the sum of the polyol compound(s) and monofunctional compound relative to the diisocyanate compound(s), whereby a hydroxyl-terminated polyurethane prepolymer is formed; and (B) converting the polyurethane prepolymer and one or more isocyanate silane(s) of the formula (I): OCN—R—Si—$(R1)_m$ $(-OR2)_{3-m}$, where m is 0, 1 or 2, each R2 is an alkyl radical having 1 to 4 carbon atoms, each R1 is an alkyl radical having 1 to 4 carbon atoms, and R is a difunctional organic group. Also compounds comprising the silylated polyurethane that can be so produced, and the use thereof as an adhesive and sealant or coating composition.

12 Claims, No Drawings

CURABLE COMPOUND COMPRISING SILYLATED POLYURETHANE

This application is a continuation of International Application No. PCT/EP2008/066630, filed Dec. 2, 2008, published on Jun. 11, 2009 under Publication No. WO 2009/071542, which claims the benefit of German Patent Application No. 10 2007 058 483.2 filed Dec. 4, 2007, the contents of each of which are incorporated herein by reference in their entirety.

The present invention relates to silane-crosslinking, curable compositions, their preparation and their use in adhesives and silanes.

Polymer systems having reactive alkoxysilyl groups are known. In the presence of atmospheric moisture these alkoxysilane-terminated polymers are capable even at room temperature of fusing with one another and eliminating the alkoxy groups. Depending on the content of alkoxysilyl groups and their structure, this causes mainly long-chain polymers (thermoplastics), relatively coarse-meshed three-dimensional networks (elastomers) or highly crosslinked systems (thermosets) to form.

The polymers usually have an organic basic framework bearing alkoxysilyl groups at the ends. The organic basic framework can be polyurethane, polyester, polyether, etc., for example.

One-component, moisture-curing adhesives and sealants have played a significant role in many technical applications for years. In addition to the polyurethane adhesives and sealants having free isocyanate groups and the traditional silicone adhesives and sealants based on dimethyl polysiloxanes, the use of so-called modified silane adhesives and sealants has also gained ground in recent times. In this last group the main component of the polymer backbone is a polyether and the reactive, crosslinkable end groups are alkoxysilyl groups. As compared with polyurethane adhesives and sealants, modified silane adhesives and sealants have the advantage of being free from isocyanate groups, in particular monomeric diisocyanate groups, and they also have the characteristic feature of a broad adhesive spectrum on a wide range of substrates without surface pretreatment with primers.

U.S. Pat. No. 4,222,925 A and U.S. Pat. No. 3,979,344 A describe siloxane-terminated organic sealant compositions which are curable even at room temperature, based on reaction products of isocyanate-terminated polyurethane prepolymers with 3-aminopropyl trimethoxysilane or 2-aminoethyl-, 3-aminopropyl methoxysilane to isocyanate-free siloxane-terminated prepolymers. However, adhesives and sealants based on these prepolymers have unsatisfactory mechanical properties, particularly in terms of their elongation and tear strength.

The methods listed below for preparing silane-terminated prepolymers based on polyethers have already been described:
  Copolymerization of unsaturated monomers with examples having alkoxysilyl groups, such as e.g. vinyl trimethoxysilane.
  Grafting of unsaturated monomers such as vinyl trimethoxysilane onto thermoplastics such as polyethylene.
  Hydroxy-functional polyethers are reacted with unsaturated chlorine compounds, e.g. allyl chloride, in an ether synthesis in polyethers having terminal olefinic double bonds, which in turn are reacted with hydrosilane compounds having hydrolyzable groups, such as e.g. HSi(OCH$_3$)$_3$, in a hydrosilylation reaction under the catalytic influence of for example transition metal compounds of the 8$^{th}$ group to form silane-terminated polyethers.
  In another method the polyethers containing olefinically unsaturated groups are reacted with a mercaptosilane such as for example 3-mercaptopropyl trialkoxysilane.
  In a further method hydroxyl-group-containing polyethers are first reacted with diisocyanates or polyisocyanates, which are then in turn reacted with amino-functional silanes or mercapto-functional silanes to form silane-terminated prepolymers.
  A further possibility provides for reacting hydroxy-functional polyethers with isocyanato-functional silanes such as for example 3-isocyanatopropyl trimethoxysilane.

These preparation methods and the use of the aforementioned silane-terminated prepolymers in adhesive/sealant applications are mentioned for example in the following patents: U.S. Pat. No. 3,971,751, EP-A-70475, DE-A-19849817, U.S. Pat. No. 6,124,387 U.S. Pat. No. 5,990,257 U.S. Pat. No. 4,960,844, U.S. Pat. No. 3,979,344, U.S. Pat. No. 3,632,557, DE-A-4029504, EP-A-601021 or EP-A-370464.

EP-A-0931800 describes the preparation of silylated polyurethanes by reacting a polyol component having a terminal unsaturation of less than 0.02 meq/g with a diisocyanate to form a hydroxyl-terminated prepolymer, which is then reacted with an isocyanatosilane of the formula OCN—R—Si—(X)$_m$(—OR$^1$)$_{3-m}$, wherein m is 0, 1 or 2 and each R$^1$ residue is an alkyl group having 1 to 4 C atoms and R is a difunctional organic group. According to the teaching of this publication such silylated polyurethanes have a superior combination of mechanical properties and cure within reasonable times to form a low-tack sealant, without exhibiting excessive viscosity.

WO-A-2003 066701 discloses polyurethane prepolymers having alkoxysilane and OH end groups and based on high-molecular-weight polyurethane prepolymers, having reduced functionality for use as binders for low-molecular-weight sealants and adhesives. To this end a polyurethane prepolymer consisting of a diisocyanate component having an NCO content of 20 to 60% and a polyol component, comprising a polyoxyalkylene diol with a molecular weight of between 3000 and 20,000 as the main component, should first be reacted, the reaction being stopped when 50 to 90% of the OH groups have been converted. This reaction product should then be reacted further with a compound having alkoxysilane and amino groups. Through these measures prepolymers having a relatively low average molecular weight and low viscosity should be obtained, which should guarantee the achievement of excellent properties.

Moisture-curing alkoxysilane-functional polyether urethane compositions are known from WO-A-2005 042605 which contain 20 to 90 wt. % of a polyether urethane A having two or more reactive silane groups and 10 to 80 wt. % of a polyether urethane B have one reactive silane group. The polyether urethane A should have polyether segments having a number-average molecular weight (M$_n$) of at least 3000 and an unsaturation of less than 0.04 meq/g, and the reactive silane groups should be inserted by reacting an isocyanate-reactive group with a compound of the formula OCN—Y—Si—(X)$_3$. The polyether urethane B should have one or more polyether segments having a number-average molecular weight (M$_n$) of 1000 to 15,000 and the reactive silane groups should be inserted by reacting an isocyanate group with a compound of the formula HN(R$_1$)—Y—Si—(X)$_3$. R$_1$ is an alkyl, cycloalkyl or aromatic group having 1 to 12 C atoms, X is an alkoxy group and Y is a linear radical having 2 to 4 C atoms or branched radical having 5 to 6 C atoms.

To reduce the functionality and hence the crosslink density of moisture-curing alkoxysilane-terminated polyurethane, WO-A-92/05212 proposes incorporating monofunctional isocyanates mixed with diisocyanates in the synthesis. Monoisocyanates are known to have a very high vapor pressure and owing to their toxicity they are potentially harmful materials from a health and safety perspective.

There is also a need for isocyanate-free compositions for preparing one-component or two-component adhesives and sealants which have an acceptable cure time and exhibit particularly good elasticity and extensibility after curing. There is further a desire for an efficient synthesis route and for compositions which exhibit no residual tackiness.

The object of the present invention is therefore to provide isocyanate-free, crosslinkable compositions having high elasticity and good extensibility. A user-friendly cure time is also desired.

The manner in which the object is achieved according to the invention can be ascertained from the claims.

It consists substantially in the provision of a method for preparing a silylated polyurethane, comprising:
(A) reacting
  (i) at least one polyol compound having a molecular weight of 4000 to 30,000 daltons or g/mol and at least one compound that is monofunctional with regard to isocyanates with
  (ii) at least one diisocyanate, in a stoichiometric excess of the sum of polyol compound(s) and monofunctional compound relative to the diisocyanate compound(s), forming a polyurethane prepolymer which is hydroxyl-terminated; and
(B) reacting the polyurethane prepolymer with one or more isocyanatosilanes of the formula (I):

$$OCN-R-Si-(R^1)_m(-OR^2)_{3-m} \quad (I)$$

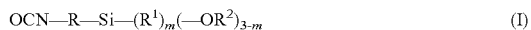

in which m is 0, 1 or 2, each $R^2$ is an alkyl residue having 1 to 4 carbon atoms, each $R^1$ is an alkyl residue having 1 to 4 carbon atoms and R is a difunctional organic group.

The polyurethane prepolymer is reacted with one or more isocyanatosilanes of the formula (I) according to (B) in order to cap the hydroxyl groups of the prepolymer with the isocyanatosilane or to introduce silyl termination.

The present invention also provides a silylated polyurethane which can be prepared by the aforementioned method according to the invention for preparing a silylated polyurethane. The invention thus also relates to a silylated polyurethane, which is prepared by reacting at least one polyol compound having a molecular weight of 4000 to 30,000 g/mol and at least one compound that is monofunctional with regard to isocyanates with at least one diisocyanate, in a stoichiometric excess of the sum of polyol compound or polyol compounds and monofunctional compound relative to the diisocyanate compound(s). This reaction gives rise to a polyurethane prepolymer which is terminated with hydroxyl groups. This hydroxyl-terminated polyurethane prepolymer is then reacted with one or more isocyanatosilanes of the formula (I)

$$OCN-R-Si-(R^1)_m(-OR^2)_{3-m} \quad (I)$$

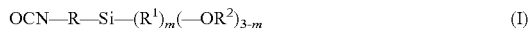

wherein the hydroxyl groups of the prepolymer are capped with the isocyanatosilane or silyl termination is introduced, such that a polyurethane prepolymer having terminal alkoxysilyl groups is formed. In formula (I) m is a whole number between 0 and 2, $R^1$ is an alkyl residue having 1 to 4 carbon atoms, $R^2$ is likewise an alkyl residue having 1 to 4 carbon atoms and R is a difunctional organic group, which can preferably be an alkylene group having 1 to 4 carbon atoms.

The present invention also provides a moisture-curing adhesive, sealant or coating agent preparation and the use thereof, which contains one or more silylated polyurethanes of the aforementioned type or prepared by the aforementioned method. In addition to the silylated polyurethane(s) according to the invention this preparation can also contain further constituents, such as for example plasticizers, fillers, catalysts and additional auxiliary substances and additives.

A large number of polymers bearing at least two hydroxyl groups can be used in principle as polyol compounds or polyols, with polyesters, polyols, hydroxyl-group-containing polycaprolactones, hydroxyl-group-containing polybutadienes or polyisoprenes and the hydrogenation products thereof and also hydroxyl-group-containing polyacrylates or polymethacrylates being cited by way of example. Mixtures of different polyol compounds can also be used.

However, polyoxyalkylenes, in particular polyethylene oxides and/or polypropylene oxides, are most particularly preferably used.

Polyols containing polyether as the polymer framework have a flexible and elastic structure, not only at the end groups but also in the polymer backbone. They can be used for preparing compositions having further improved elastic properties. Polyethers are not only flexible in their basic framework but also resistant at the same time. Thus unlike polyesters, for example, polyethers are not attacked or decomposed by water and bacteria.

Polyethylene oxides and/or polypropylene oxides are therefore particularly preferably used.

The molecular weight $M_n$ of the polymer framework of the polyol compounds is between 4000 and 30,000 g/mol (daltons). According to a preferred embodiment of the invention the molecular weight $M_n$ of the polyol compound is between 5000 and 25,000 g/mol. Further particularly preferred molecular weight ranges are 8000 to 20,000 g/mol, with 12,000 to 19,000 and 15,000 to 18,000 being most particularly preferred.

These molecular weights are particularly advantageous, as compositions prepared using polyol compounds with these molecular weights have viscosities which allow easy processing.

According to a preferred embodiment of the method according to the invention, a polyol compound is used, in particular a polyoxyalkylene, in particular polyethylene oxide and/or polypropylene oxide.

Polyoxyalkylenes, in particular polyethylene oxides or polypropylene oxides, having a polydispersity PD of less than 2, preferably less than 1.5, in particular less than 1.3, are most particularly preferably used.

The molecular weight $M_n$ is understood to be the number-average molecular weight of the polymer. Like the weight-average molecular weight $M_w$, this can be determined by gel permeation chromatography (GPC, also known as SEC). This method is known to the person skilled in the art. The polydispersity derives from the average molecular weights $M_w$ and $M_n$. It is calculated as $PD=M_w/M_n$.

Particularly advantageous viscoelastic properties can be achieved if polyoxyalkylene polymers having a narrow molar mass distribution and hence a low polydispersity are used as the polymeric basic frameworks. These can be prepared by means of double metal cyanide catalysis (DMC catalysis), for example. These polyoxyalkylene polymers generally have the characteristic feature of a particularly narrow molar mass distribution, a high average molar mass and a very low number of double bonds at the ends of the polymer chains.

Such polyoxyalkylene polymers have a polydispersity PD ($M_w/M_n$) of at most 1.7.

Particularly preferred organic basic frameworks are for example polyethers having a polydispersity of around 1.01 to around 1.3, in particular around 1.05 to around 1.18, for example around 1.08 to around 1.11 or around 1.12 to around 1.14.

In a preferred embodiment of the invention these polyethers have an average molecular weight ($M_n$) of around 5000 to around 30,000 g/mol, in particular around 6000 to around 25,000 g/mol. Polyethers having average molecular weights of around 10,000 to around 22,000 g/mol are particularly preferred, in particular those having average molecular weights of around 12,000 to around 18,000 or 15,000 to 18,000 g/mol.

Ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3 and -1,4 diisocyanate, bis-(2-isocyanatoethyl)fumarate, 1-isocyanato-3,3,5-trimethyl-5-isocyanatomethyl cyclohexane (isophorone diisocyanate, IPDI), 2,4- and 2,6-hexahydrotoluoylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethyl xylylene diisocyanate (TMXDI), 1,3- and 1,4-phenylene diisocyanate, 2,4- or 2,6-toluoylene diisocyanate (TDI), 2,4'-diphenylmethane diisocyanate, 2,2'-diphenylmethane diisocyanate or 4,4'-diphenylmethane diisocyanate (MDI) and isomer mixtures thereof are suitable for example as diisocyanates for preparing the hydroxyl-terminated polyurethane prepolymer. Also suitable are partially or completely hydrogenated cycloalkyl derivatives of MDI, for example completely hydrogenated MDI (H12-MDI), alkyl-substituted diphenylmethane diisocyanates, for example mono-, di-, tri- or tetraalkyl diphenylmethane diisocyanate and the partially or completely hydrogenated cycloalkyl derivatives thereof, 4,4'-diisocyanatophenyl perfluoroethane, phthalic acid bis-isocyanatoethyl ester, 1-chloromethylphenyl-2,4- or -2,6-diisocyanate, 1-bromomethylphenyl-2,4- or -2,6-diisocyanate, 3,3-bis-chloromethyl ether-4,4'-diphenyl diisocyanate, sulfur-containing diisocyanates, such as can be obtained by reacting 2 mol of diisocyanate with 1 mol of thiodiglycol or dihydroxydihexyl sulfide, the diisocyanates of dimer fatty acids, or mixtures of two or more of the cited diisocyanates.

According to a preferred embodiment of the method according to the invention the compound that is monofunctional with regard to isocyanates is selected from monoalcohols, monomercaptans, monoamines or mixtures thereof.

According to step (A) (i) an amount of the polyol mixture consisting of at least one polyol compound having a molecular weight of 4000 to 30,000 g/mol and a compound that is monofunctional with regard to isocyanates is used such that the sum of polyol compounds and monofunctional compound (s) (with regard to isocyanates) is used in stoichiometric excess relative to the diisocyanate compound(s). This means that the total number of hydroxyl groups from polyol compound(s) and optionally monoalcohol and optionally SH or amine groups from monomercaptans or monoamines is used in stoichiometric excess relative to the isocyanate groups of the diisocyanate compound(s), i.e. it is higher than the number of isocyanate groups. It is preferable, however, if such a large excess is used that the sum of polyol compounds is also used in stoichiometric excess relative to the isocyanate compound(s). In this case the total number of hydroxyl groups from the polyol compounds is in stoichiometric excess relative to the isocyanate groups of the diisocyanate compound (s), i.e. higher than the number of isocyanate groups. The use of a polyol mixture consisting of one or more polyol compounds and at least one compound that is monofunctional with regard to isocyanates is particularly preferred, for example a polyol mixture consisting of a polyol compound and a compound that is monofunctional with regard to isocyanates.

The functionality of the resulting silylated polyurethanes can be controlled in this way such that for example a preferred degree of silylation or degree of silyl termination of 1.5 to less than 2.0, in particular 1.6 to 1.8, can be established.

According to the invention such compounds having isocyanate-reactive groups with a functionality of 1 are suitable as monofunctional compounds (with regard to isocyanates). In principle all monofunctional alcohols (monoalcohols), amines (monoamines) or mercaptans (monomercaptans) can be used for this purpose, these are in particular monofunctional alcohols having up to 36 carbon atoms, monofunctional primary and/or secondary amines having up to 36 carbon atoms or monofunctional mercaptans having up to 36 carbon atoms. However, mixtures of polyalcohols, polyamines and/or polymercaptans can also be used as monofunctional compounds, provided that their average functionality is well below 2.

Monoalcohols such as benzyl alcohol, methanol, ethanol, the isomers of propanol, butanol and hexanol, monoethers of ethylene glycol and/or diethylene glycol, and the primary alcohols having 8 to 18 C atoms which are obtainable by reducing fatty acids, such as octanol, decanol, dodecanol, tetradecanol, hexadecanol and octadecanol, are particularly preferred for example, particularly in the form of technical mixtures thereof. Monoalcohols having 4 to 18 C atoms are preferred, as low alcohols can be prepared anhydrously only with difficulty.

Monoalkyl polyether alcohols of differing molecular weight can also be used, a number-average molecular weight of between 1000 and 2000 g/mol being preferred. A preferred representative is monobutyl propylene glycol, for example.

Saturated fatty alcohols having up to 26 carbon atoms can also be used, preferably those having up to 22 carbon atoms, which are synthesized on an industrial scale by reduction (hydrogenation) of fatty acid methyl esters. Hexanol, octanol, nonanol, decanol, lauryl alcohol, myristyl alcohol, cetyl alcohol, stearyl alcohol, gadoleyl alcohol and behenyl alcohol or the Guerbet alcohols 2-hexyl decanol, 2-octyl dodecanol, 2-decyl tetradecanol, 2-dodecyl hexadecanol, 2-tetradecyl octadecanol, 2-hexadecyl eicosanol, Guerbet alcohol consisting of erucyl alcohol, behenyl alcohol and ocenols can be cited by way of example.

Mixtures resulting from the guerbetization of technical fatty alcohols together with the other aforementioned alcohols can optionally be used.

The proportion of the compound(s) that is (are) monofunctional (with regard to isocyanates) is preferably 10 to 40 mol %, relative to the polyol mixture containing polyol compound (s) and at least one compound that is monofunctional (with regard to isocyanates); a proportion of monofunctional compound(s) of 15 to 30 mol % is particularly preferred.

The stoichiometric excess of the sum of polyol compound or polyol compounds and monofunctional compound relative to the diisocyanate compound or mixture of diisocyanates used is 1.1 to 2.0, preferably between 1.2 and 1.5. This ensures that a polyurethane prepolymer having terminal hydroxyl groups is formed as the reaction product of stage A.

The isocyanatosilanes listed below are suitable for the subsequent reaction of the hydroxyl-terminated polyurethane prepolymer with one or more isocyanatosilanes or isocyanato-functional alkoxysilanes of the formula (I): Methyldimethoxysilyl methyl isocyanate, ethyldimethoxysilyl methyl isocyanate, methyldiethoxysilyl methyl isocyanate, ethyldiethoxysilyl methyl isocyanate, methyldimethoxysilyl ethyl isocyanate, ethyldimethoxysilyl ethyl isocyanate, methyldiethoxysilyl ethyl isocyanate, ethyldiethoxysilyl ethyl isocyanate, methyldimethoxysilyl propyl isocyanate, ethyldimethoxysilyl propyl isocyanate, methyldiethoxysilyl propyl isocyanate, ethyldiethoxysilyl propyl isocyanate, methyldimethoxysilyl butyl isocyanate, ethyldimethoxysilyl butyl isocyanate, methyldiethoxysilyl butyl isocyanate, diethylethoxysilyl butyl isocyanate, ethyldiethoxysilyl butyl isocyanate, methyldimethoxysilyl pentyl isocyanate, ethyldimethoxysilyl pentyl isocyanate, methyldiethoxysilyl pentyl isocyanate, ethyldiethoxysilyl pentyl isocyanate, methyldimethoxysilyl hexyl isocyanate, ethyldimethoxysilyl hexyl isocyanate, methyldiethoxysilyl hexyl isocyanate, ethyldiethoxysilyl hexyl isocyanate, trimethoxysilyl methyl isocyanate, triethoxysilyl methyl isocyanate, trimethoxysilyl ethyl isocyanate, triethoxysilyl ethyl isocyanate, trimethoxysilyl propyl isocyanate, triethoxysilyl propyl isocyanate, trimethoxysilyl butyl isocyanate, triethoxysilyl butyl isocyanate, trimethoxysilyl pentyl isocyanate, triethoxysilyl pentyl isocyanate, trimethoxysilyl hexyl isocyanate, triethoxysilyl hexyl isocyanate.

R is preferably a bivalent aliphatic hydrocarbon group and can be saturated or unsaturated and preferably has a main chain of 1 to 6 carbon atoms, preferably methylene, ethylene or propylene. 2 to 6 carbon atoms are particularly preferred. R is particularly preferably further a difunctional straight or branched alkyl residue having 1 to 6, in particular 2 to 6, carbon atoms.

According to a further preferred embodiment R denotes —CH$_2$—. Such compounds have a high silyl group reactivity, which contributes to shorter setting and curing times.

According to a further preferred embodiment R denotes —(CH$_2$)$_3$—. If a propylene group is chosen for R, then these compounds have particularly high flexibility. This property is ascribed to the longer linking carbon chain, as methylene groups are generally flexible and mobile.

m is preferably zero or one, i.e. the isocyanato-functional alkoxysilane or isocyanatosilane has a trialkoxy or dialkoxy group. Polymers containing di- or trialkoxysilyl groups generally have highly reactive binding sites, which allow rapid curing, high degrees of crosslinking and hence good final strength values. A further advantage of such alkoxy-group-containing polymers is to be seen in the fact that when they cure under the influence of moisture, alcohols are formed which are safe in the released amounts and which evaporate. Such compositions are thus particularly suitable also for the DIY sector. The particular advantage of the use of dialkoxysilyl groups lies in the fact that after curing, the corresponding compositions are more elastic, softer and more flexible than systems containing trialkoxysilyl groups. They are therefore suitable in particular for use as sealants. Furthermore, they release even less alcohol as they cure and are therefore of particular interest if the amount of released alcohol is to be reduced.

With trialkoxysilyl groups, on the other hand, a higher degree of crosslinking is achieved, which is particularly advantageous if a harder, more solid material is desired after curing. Moreover, trialkoxysilyl groups are more reactive, therefore they crosslink more quickly and thus reduce the amount of catalyst required; and they offer cold-flow advantages—the dimensional stability of a corresponding adhesive under the influence of force and optionally temperature.

Methoxy, ethoxy, propyloxy and butyloxy groups in particular are chosen as alkoxy groups.

An embodiment is preferred in particular in which R$^1$ and R$^2$ are a methyl group. Depending on the nature of the alkyl residues on the oxygen atom, compounds with alkoxysilyl groups have differing reactivities in chemical reactions. Of the alkoxy groups the methoxy group has the greatest reactivity. Such silyl groups can therefore be used if a particularly rapid cure is desired. Even higher aliphatic residues such as ethoxy bring about a lower reactivity in the terminal alkoxysilyl group in comparison to methoxy groups and can advantageously be used to obtain stepped crosslinking speeds. In addition to methoxy and ethoxy groups, larger residues, which inherently have a lower reactivity, can of course also be used as hydrolyzable groups. This is of particular interest if a delayed cure is desired, for example in the case of adhesives which should allow the bonded surfaces to be moved in relation to one another even after application in order to find the final position.

Methyldimethoxysilyl methyl isocyanate, methyldiethoxysilyl methyl isocyanate, methyldimethoxysilyl propyl isocyanate and ethyldimethoxysilyl propyl isocyanate or the trialkoxy analogues thereof, in particular trimethoxysilyl propyl isocyanate and 3-isocyanatopropyl trimethoxysilane or triethoxysilyl propyl isocyanate and 3-isocyanatopropyl triethoxysilane, are particularly preferred.

The isocyanatosilane(s) is (are) used here in an at least stoichiometric amount relative to the hydroxyl groups of the polyurethane prepolymer; however, a slight stoichiometric excess of the isocyanatosilanes relative to the hydroxyl groups is preferred. This stoichiometric excess of the isocyanatosilanes relative to the hydroxyl-group-containing prepolymers is between 4 and 15 equivalent percent, preferably between 5 and 10 equivalent percent, relative to the isocyanate grouping.

The present invention also provides a silylated polyurethane which can be prepared by the aforementioned method according to the invention for preparing a silylated polyurethane. Such a silylated polyurethane can be prepared by a method comprising:

(A) reacting
  (i) at least one polyol compound having a molecular weight of 4000 to 30,000 g/mol and at least one compound that is monofunctional with regard to isocyanates with
  (ii) at least one diisocyanate, in a stoichiometric excess of the sum of polyol compound(s) and monofunctional compound relative to the diisocyanate compound(s), forming a polyurethane prepolymer which is hydroxyl-terminated; and
(B) reacting the polyurethane prepolymer with one or more isocyanatosilanes of the formula (I):

OCN—R—Si—(R$^1$)$_m$(—OR$^2$)$_{3-m}$     (I)

in which m is 0, 1 or 2, each R$^2$ is an alkyl residue having 1 to 4 carbon atoms, each R$^1$ is an alkyl residue having 1 to 4 carbon atoms and R is a difunctional organic group.

The embodiments described for the method according to the invention thus also apply to the silylated polyurethane according to the invention.

The present invention also provides a silane-crosslinking, curable composition containing at least one silylated polyurethane obtainable by the method according to the invention or at least one silylated polyurethane according to the invention.

The present invention also provides the use of a preparation containing one or more silylated polyurethanes that can be prepared by the method according to the invention or one or more silylated polyurethanes according to the invention or a composition according to the invention as an adhesive or sealant or as a coating agent.

The adhesive and sealant compositions or preparations according to the invention can also contain, in addition to the aforementioned silylated polyurethane compounds, further auxiliary substances and additives, which impart improved elastic properties, improved resilience, a sufficiently long processing time, a fast curing speed and low residual tackiness to these preparations. These auxiliary substances and additives include for example plasticizers, stabilizers, antioxidants, fillers, thinners or reactive thinners, desiccants, adhesion promoters and UV stabilizers, fungicides, flame retardants, pigments, rheological auxiliary agents, colored pigments or pigment pastes and/or optionally also a small amount of solvent.

Suitable as plasticizers are for example adipic acid esters, azelaic acid esters, benzoic acid esters, butyric acid esters, acetic acid esters, esters of higher fatty acids having around 8 to around 44 C atoms, esters of OH-group-bearing or epoxidized fatty acids, fatty acid esters and fats, glycolic acid esters, phosphoric acid esters, phthalic acid esters, linear or branched alcohols containing 1 to 12 C atoms, propionic acid esters, sebacic acid esters, sulfonic acid esters, thiobutyric acid esters, trimellitic acid esters, citric acid esters and esters based on nitrocellulose and polyvinyl acetate, as well as mixtures of two or more thereof. The asymmetrical esters of adipic acid monooctyl esters with 2-ethyl hexanol (Edenol DOA, Cognis Deutschland GmbH, Düsseldorf) or esters of abietic acid are particularly suitable.

Of the phthalic acid esters, dioctyl phthalate (DOP), dibutyl phthalate, diisoundecyl phthalate (DIUP) or butylbenzyl phthalate (BBP) are suitable for example, of the adipates, dioctyl adipate (DOA), diisodecyl adipate, diisodecyl succinate, dibutyl sebacate or butyl oleate are suitable.

Likewise suitable as plasticizers are the pure or mixed ethers of monofunctional, linear or branched $C_{4-16}$ alcohols or mixtures of two or more different ethers of such alcohols, for example dioctyl ether (available as Cetiol OE, Cognis Deutschland GmbH, Düsseldorf).

Also suitable as plasticizers are end-capped polyethylene glycols. For example, polyethylene or polypropylene glycol di-$C_{1-4}$ alkyl ethers, in particular the dimethyl or diethyl ethers of diethylene glycol or dipropylene glycol, and mixtures of two or more thereof.

Particularly preferred, however, are end-capped polyethylene glycols, such as polyethylene or polypropylene glycol dialkyl ethers, the alkyl residue having one to four C atoms, and in particular the dimethyl and diethyl ethers of diethylene glycol and dipropylene glycol. With dimethyl diethylene glycol in particular, an acceptable cure is achieved even under less favorable application conditions (low atmospheric moisture, low temperature). For further details of plasticizers, reference is made to the relevant technical chemistry literature.

Plasticizers can be incorporated into the preparations in amounts of between 0 and 40, preferably between 0 and 20 wt. % (relative to the overall composition).

"Stabilizers" within the meaning of this invention are understood to be antioxidants, UV stabilizers or hydrolysis stabilizers. Examples of these are the commercial sterically hindered phenols and/or thio ethers and/or substituted benzotriazoles and/or HALS-type amines (Hindered Amine Light Stabilizers). Within the context of the present invention it is preferable for a UV stabilizer to be used which bears a silyl group and which is incorporated into the end product on crosslinking or curing. The products Lowilite 75, Lowilite 77 (Great Lakes, USA) are particularly suitable for this purpose. Benzotriazoles, benzophenones, benzoates, cyanoacrylates, acrylates, sterically hindered phenols, phosphorus and/or sulfur can furthermore also be added. The preparation according to the invention can contain up to around 2 wt. %, preferably around 1 wt. %, of stabilizers. The preparation according to the invention can furthermore contain up to around 7 wt. %, in particular up to around 5 wt. %, of antioxidants.

All known compounds which can catalyze the hydrolytic cleavage of the hydrolyzable groups of the silane groupings and the subsequent fusing of the Si—OH group to siloxane groupings (crosslinking reaction or coupling function) can be used as catalysts. Examples of these are titanates such as tetrabutyl titanate and tetrapropyl titanate; bismuth compounds, such as bismuth-tris-2-ethyl hexanoate, tin carboxylates such as dibutyl tin dilaulate, dibutyl tin diacetate, dibutyl tin diethyl hexanoate, dibutyl tin dioctoate, dibutyl tin dimethyl maleate, dibutyl tin diethyl maleate, dibutyl tin dibutyl maleate, dibutyl tin diiosooctyl maleate, dibutyl tin ditridecyl maleate, dibutyl tin dibenzyl maleate, dibutyl tin maleate, dibutyl tin diacetate, tin octaoate, dioctyl tin disteareate, dioctyl tin dilaurate, dioctyl tin diethyl maleate, dioctyl tin diisooctyl maleate, dioctyl tin diacetate, and tin naphthenoate; tin alkoxides such as dibutyl tin dimethoxide, dibutyl tin diphenoxide, and dibutyl tin diisopropoxide; tin oxides such as dibutyl tin oxide, and dioctyl tin oxide; reaction products between dibutyl tin oxides and phthalic acid esters, dibutyl tin bisacetyl acetonate; organoaluminum compounds such as aluminum trisacetyl acetonate, aluminum trisethyl acetoacetate, and diisopropoxyaluminum ethyl acetoacetate; chelate compounds such as zirconium tetraacetyl acetonate, and titanium tetraacetyl acetonate; lead octanoate; amine compounds or salts thereof with carboxylic acids, such as butylamine, octylamine, laurylamine, dibutylamines, monoethanolamines, diethanolamines, triethanolamine, diethylene triamine, triethylene tetramine, oleylamines, cyclohexylamine, benzylamine, diethyl aminopropylamine, xylylene diamine, triethylene diamine, guanidine, diphenyl guanidine, 2,4,6-tris(dimethylaminomethyl)phenol, morpholine, N-methylmorpholine and 1,8-diazabicyclo-(5.4.0)-undecene-7 (DBU), a low-molecular-weight polyamide resin obtained from an excess of a polyamine and a polybasic acid, adducts of a polyamine in excess with an epoxide, silane adhesion promoters with amino groups, such as 3-aminopropyl trimethoxysilane, and N-(β-aminoethyl)aminopropylmethyl dimethoxysilane. The catalyst, preferably mixtures of several catalysts, are used in an amount of 0.001 to around 5 wt %, relative to the total weight of the preparation. Percentages by weight of 0.01 to 1 are preferred, in particular 0.03 to 0.5, particularly preferably less than 0.1 wt. % of catalyst, relative to the total weight of the preparation.

The composition or preparation according to the invention can additionally contain fillers. Chalk, lime dust, precipitated and/or pyrogenic silica, zeolites, bentonites, magnesium carbonate, kieselguhr, alumina, clay, talc, titanium oxide, iron oxide, zinc oxide, sand, quartz, flint, mica, glass powder and other ground mineral substances, for example, are suitable here. Organic fillers can also be used, in particular carbon black, graphite, wood fibers, wood flour, sawdust, cellulose, cotton, pulp, cotton, wood chips, chopped straw, chaff, ground walnut shells and other chopped fibers. Short fibers such as glass fibers, glass filament, polyacrylonitrile, carbon fibers, Kevlar fibers or polyethylene fibers can also be added. Aluminum powder is also suitable as a filler.

The pyrogenic and/or precipitated silicas advantageously have a BET surface area of 10 to 90 m²/g, in particular 35 to 65 m²/g. Their use brings about no additional rise in the viscosity of the preparation according to the invention but contributes to a reinforcement of the cured preparation.

A fine-particle silica having a BET surface area of 45 to 55 m²/g is particularly preferably used, in particular having a BET surface area of around 50 m²/g. Such silicas have the additional advantage of a 30 to 50% shorter incorporation time as compared with silicas having a larger BET surface area. A further advantage lies in the fact that the cited fine-particle silica can be incorporated into silane-terminated adhesives, sealants or coating compounds in a considerably higher concentration without adversely affecting the flow properties of the adhesives, sealants or coating compounds.

It is also possible to use pyrogenic and/or precipitated silicas having a larger BET surface area, advantageously of 100 to 250 m²/g, in particular 110 to 170 m²/g, as a filler. By virtue of the larger BET surface area it is possible to achieve the same effect, for example reinforcement of the cured preparation, with a smaller percentage by weight of silica. In this way further substances can be used to improve the preparation according to the invention with regard to other requirements.

Hollow beads having a mineral shell or a plastic shell are also suitable as fillers. These can be hollow glass beads, for example, which are available commercially under the trade name Glass Bubbles®. Plastic-based hollow beads are available for example under the trade name Expancel® or Dualite®. These are composed of inorganic or organic substances, each having a diameter of 1 mm or less, preferably 500 µm or less.

Fillers which impart thixotropic properties to the preparations are preferred for some applications. Such fillers are also described as rheological additives or auxiliary agents, for example silica gels, aerosils, carbon, carbon black or swellable plastics such as PVC. The following organic additives can also be used as rheological modifiers: hydrogenated castor oil, fatty acid amides, urea derivatives and polyurea derivatives. To enable them to be easily squeezed out of a dispensing device (e.g. tube), such preparations have a viscosity of 30,000 to 150,000, preferably 40,000 to 80,000 mPas, in particular 50,000 to 60,000 mPas or also 3000 to 15,000 mPas.

The fillers are preferably used in an amount of 1 to 80 wt. %, preferably 5 to 60 wt. %, relative to the total weight of the preparation.

Examples of suitable pigments are titanium dioxide, iron oxides or carbon black.

It often makes sense to further stabilize the preparations according to the invention against moisture penetration using desiccants, to further increase the shelf life. There is occasionally also a need to lower the viscosity of the adhesive or sealant according to the invention for certain applications through the use of a reactive thinner. All compounds which can be mixed with the adhesive or sealant to lower its viscosity and which have at least one moisture-crosslinking or binder-reactive group can be used as reactive thinners.

The following substances, for example, can be used as reactive thinners: polyalkylene glycols reacted with isocyanatosilanes (e.g. Synalox 100-50B, DOW), carbamatopropyl trimethoxysilane, alkyl trimethoxysilane, alkyl triethoxysilane, such as methyl trimethoxysilane, methyl triethoxysilane and vinyl trimethoxysilane (XL 10, Wacker), vinyl triethoxysilane, phenyl trimethoxysilane, phenyl triethoxysilane, octyl trimethoxysilane, tetraethoxysilane, vinyl dimethoxymethylsilane (XL12, Wacker), vinyl triethoxysilane (GF56, Wacker), vinyl triacetoxysilane (GF62, Wacker), isooctyl trimethoxysilane (IO Trimethoxy), isooctyl triethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyl trimethoxysilane, 3-octanoyl thio-1-propyl triethoxysilane and partial hydrolyzates of these compounds.

The following polymers from Kaneka Corp can furthermore likewise be used as reactive thinners: MS S203H, MS S303H, MS SAT 010, and MS SAX 350.

Silane-modified polyethers which derive for example from the reaction of isocyanatosilane with Synalox grades can likewise be used.

Many of the aforementioned silane-functional reactive thinners simultaneously have a drying and/or coupling action in the preparation. These reactive thinners are used in amounts of between 0.1 and 15 wt. %, preferably between 1 and 5 wt. %, relative to the overall composition of the preparation.

An adhesion promoter is understood to be a substance which improves the adhesion properties of adhesive films on surfaces. One or more adhesion promoters can be included. Also suitable as adhesion promoters, however, are tackifiers such as hydrocarbon resins, phenolic resins, terpene-phenolic resins, resorcinol resins or derivatives thereof, modified or unmodified rosin acids or esters (abietic acid derivatives), polyamines, polyaminoamides, anhydrides and anhydride-containing copolymers. The addition of polyepoxide resins in small amounts can also improve adhesion on some substrates. To this end the solid epoxide resins having a molecular weight of over 700 are preferably used in finely ground form. If tackifiers are used as adhesion promoters, the nature and amount thereof depends on the adhesive/sealant composition and on the substrate to which this is applied. Typical tackifying resins (tackifiers) such as for example terpene-phenolic resins or rosin acid derivatives are used in concentrations of between 5 and 20 wt. %, typical adhesion promoters such as polyamines, polyaminoamides or phenolic resins or resorcinol derivatives are used in the range between 0.1 and 20 wt. %, in particular 0.5 to 10, particularly preferably 1 to 5 wt. %, relative to the overall composition of the preparation. Silane adhesion promoters, in particular alkoxysilanes, having a (further) functional group, such as for example an amino group, a mercapto group, an epoxy group, a carboxyl group, a vinyl group, an isocyanate group, an isocyanurate group or a halogen, are particular suitable. Examples are γ-mercaptopropyl trimethoxysilane, γ-mercaptopropyl triethoxysilane, γ-mercaptopropyl methyldimethoxysilane, γ-glycidoxypropyl trimethoxysilane, γ-glycidoxypropyl triethoxysilane, γ-glycidoxypropyl methyl dimethoxysilane, β-carboxyethyl triethoxysilane, β-carboxyethyl phenyl bis-(2-methoxyethoxy)silane, N-β-(carboxymethyl)aminoethyl-γ-aminopropyl trimethoxysilane, vinyl trimethoxysilane, vinyl triethoxysilane, γ-acryloxypropyl methyl triethoxysilane, γ-isocyanatopropyl trimethoxysilane, γ-isocyanatopropyl triethoxysilane, γ-isocyanatopropyl methyl diethoxysilane, γ-isocyanatopropyl methyl dimethoxysilane, tris(trimethoxysilyl) isocyanurate and γ-chloropropyl trimethoxysilane.

Particularly preferred as adhesion promoters are in particular aminosilanes (amino-functional alkoxysilanes or aminoalkyl alkoxysilanes), such as for example γ-aminopropyl trimethoxysilane, γ-aminopropyl triethoxysilane, γ-aminopropyl triisopropoxysilane, γ-aminopropyl methyl dimethoxysilane, γ-aminopropyl methyl diethoxysilane, γ-(2-aminoethyl)-3-aminopropyl trimethoxysilane, γ-(2-aminoethyl) aminopropyl methyl dimethoxysilane, γ-(2-aminoethyl) aminopropyl triethoxysilane, γ-(2-aminoethyl)aminopropyl methyl diethoxysilane, γ-(2-aminoethyl)aminopropyl triisopropoxysilane, N-phenyl-γ-aminopropyl trimethoxysilane, N-benzyl-γ-aminopropyl trimethoxysilane, and N-vinylbenzyl-γ-aminopropyl triethoxysilane, or oligomeric aminosilanes, such as for example aminoalkyl-group-modified alkylpolysiloxane (Dynasylan 1146).

The preparation according to the invention is prepared according to known methods by intimate mixing of the constituents in suitable dispersing units, for example high-speed mixers, compounders, planetary mixers, planetary agitators, internal mixers, Banbury mixers, twin-screw extruders and similar mixing units known to the person skilled in the art.

The preparations according to the invention are suitable as moisture-curing adhesive and sealant preparations as well as coating agents and pressure-sensitive adhesives.

A preferred embodiment of the preparation according to the invention can contain:

- 5 to 50 wt. %, preferably 10 to 40 wt. %, of one or more compounds of the silylated polyurethanes according to the invention,
- 0 to 30 wt. %, in particular less than 20 wt. %, particularly preferably less than 10 wt. % of plasticizers, for example 0.5 to 30, in particular 1 to 25 wt. % of plasticizers,
- 0 to 80 wt. %, preferably 20 to 60 wt. %, particularly preferably 30 to 55 wt. % of fillers.

The embodiment can also contain further auxiliary substances, for example 0 to 10 wt. %, in particular 0.5 to 5 wt. %.

The entirety of all constituents adds to 100 wt %, wherein the sum of the aforementioned main constituents alone does not have to add to 100 wt. %.

The embodiment examples below are intended to illustrate the invention in more detail, wherein the choice of examples is not intended to limit the scope of the subject matter of the invention.

EXAMPLES

Comparative Example 1

Use of Monoisocyanate 1285 g (156 mmol) of polypropylene glycol 8000 (hydroxyl value=13.6) and 348 g of diisoundecyl phthalate (DIUP) are dried in a 2000 ml three-necked flask at 80° C. under vacuum. 0.35 g of dibutyl tin laurate are added at 80° C. under a nitrogen atmosphere. Then 27.1 g (104 mmol) of TMXDI are added and after stirring for one hour 2.1 g (17 mmol) of phenyl isocyanate followed by 20.5 g (95 mmol) of isocyanatopropyl trimethoxysilane (% NCO=19.6) are added and the mixture is stirred for a further hour at 80° C. The prepolymer mixture formed is cooled and 34.8 g of vinyl trimethoxysilane and 22.4 g of a mixture of 70 wt. % of bis-(1,2,2,6,6-pentamethyl-4-piperidyl) sebacate and 30 wt. % of methyl-1,2,2,6,6-pentamethyl-4-piperidyl sebacate (Tinuvin 765) are added. The product is stored in a moisture-proof glass vessel under a nitrogen atmosphere before it is processed further in accordance with the general instructions to form a curable preparation.

Comparative Example 2

No Addition of Monofunctional Compounds 324 g (38 mmol) of polypropylene glycol 8000 (hydroxyl value=13.6) are dried in a 500 ml three-necked flask at 80° C. under vacuum. 0.07 g of dibutyl tin laurate are added at 80° C. under a nitrogen atmosphere. Then 5.8 g (23 mmol) of TMXDI are added and after stirring for one hour 7.9 g (37 mmol) of isocyanatopropyl trimethoxysilane (% NCO=19.6) are added and the mixture is stirred for a further hour at 80° C. The prepolymer mixture formed is cooled and 7.0 g of vinyl trimethoxysilane and 5.3 g of a mixture of 70 wt. % of bis-(1,2,2,6,6-pentamethyl-4-piperidyl) sebacate and 30 wt. % of methyl-1,2,2,6,6-pentamethyl-4-piperidyl sebacate (Tinuvin 765) are added. The product is stored in a moisture-proof glass vessel under a nitrogen atmosphere before it is processed further in accordance with the general instructions to form a curable preparation.

Comparative Example 3

Use of Monoisocyanate 1596 g (141 mmol) of polypropylene glycol 12000 (hydroxyl value=9.7) are dried in a 2000 ml three-necked flask at 80° C. under vacuum. 0.35 g of dibutyl tin laurate are added at 80° C. under a nitrogen atmosphere. Then 17.6 g (72 mmol) of TMXDI are added and after stirring for one hour 5.2 g (42 mmol) of phenyl isocyanate followed by 24.2 g (113 mmol) of isocyanatopropyl trimethoxysilane (% NCO=19.6) are added and the mixture is stirred for a further hour at 80° C. The prepolymer mixture formed is cooled and 34.0 g of vinyl trimethoxysilane and 22.0 g of a mixture of 70 wt. % of bis-(1,2,2,6,6-pentamethyl-4-piperidyl) sebacate and 30 wt. % of methyl-1,2,2,6,6-pentamethyl-4-piperidyl sebacate (Tinuvin 765) are added. The product is stored in a moisture-proof glass vessel under a nitrogen atmosphere before it is processed further in accordance with the general instructions to form a curable preparation.

Comparative 4

No Monofunctional Addition 1255 g (152 mmol) of polypropylene glycol 8000 (hydroxyl value=13.6) and 340 g of DIUP are dried in a 2000 ml three-necked flask at 80° C. under vacuum. 0.34 g of dibutyl tin laurate are added at 80° C. under a nitrogen atmosphere. Then 26.5 g (106 mmol) of TMXDI are added and after stirring for one hour 21.5 g (100 mmol) of isocyanatopropyl trimethoxysilane (% NCO=19.6) are added and the mixture is stirred for a further hour at 80° C. The prepolymer mixture formed is cooled and 34.0 g of vinyl trimethoxysilane and 21.9 g of a mixture of 70 wt. % of bis-(1,2,2,6,6-pentamethyl-4-piperidyl) sebacate and 30 wt % of methyl-1,2,2,6,6-pentamethyl-4-piperidyl sebacate (Tinuvin 765) are added. The product is stored in a moisture-proof glass vessel under a nitrogen atmosphere before it is processed further in accordance with the general instructions to form a curable preparation.

Example 1

According to the Invention 264 g (32 mmol) of polypropylene glycol 8000 (hydroxyl value=13.6), 70 g of DIUP and 0.5 g (4 mmol) of ethyl hexanol are dried in a 500 ml three-necked flask at 80° C. under vacuum. 0.07 g of dibutyl tin laurate are added at 80° C. under a nitrogen atmosphere. Then 6 g (25 mmol) of TMXDI are added and after stirring for one hour 4.5 g (23 mmol) of isocyanatopropyl trimethoxysilane (% NCO=19.6) are added and the mixture is stirred for a further hour at 80° C. The prepolymer mixture formed is cooled and 7.0 g of vinyl trimethoxysilane and 5.3 g of a mixture of 70 wt. % of bis-(1,2,2,6,6-pentamethyl-4-piperidyl) sebacate and 30 wt. % of methyl-1,2,2,6,6-pentamethyl-4-piperidyl sebacate (Tinuvin 765) are added. The product is stored in a moisture-proof glass vessel under a nitrogen atmosphere before it is processed further in accordance with the general instructions to form a curable preparation.

Example 2

According to the Invention 323 g (28 mmol) of polypropylene glycol 12000 (hydroxyl value=9.7) and 1.2 g (9 mmol) of ethyl hexanol are dried in a 500 ml three-necked flask at 80° C. under vacuum. 0.07 g of dibutyl tin laurate are added at 80° C. under a nitrogen atmosphere. Then 5.5 g (23 mmol) of TMXDI are added and after stirring for one hour 4.5 g (23 mmol) of isocyanatopropyl trimethoxysilane (% NCO=19.6) are added and the mixture is stirred for a further hour at 80° C. The prepolymer mixture formed is cooled and 7.0 g of vinyl trimethoxysilane and 5.3 g of a mixture of 70 wt. % of bis-(1,2,2,6,6-pentamethyl-4-piperidyl) sebacate and 30 wt. % of methyl-1,2,2,6,6-pentamethyl-4-piperidyl sebacate (Tinuvin 765) are added. The product is stored in a moisture-proof glass vessel under a nitrogen atmosphere before it is processed further in accordance with the general instructions to form a curable preparation.

General Instructions for Preparing the Curable Preparations According to the Invention:

25 parts by weight of the polymer mixture prepared in the examples were then intimately mixed in a stirred-tank reactor with 20 parts by weight of diisoundecyl phthalate for 30 s using a SpeedMixer.

45 parts by weight of precipitated calcium carbonate (50% each of Socal U1S2 and Omya BLP3), 3.35 parts by weight of stabilized rutile titanium dioxide (Kronos 2056), 1.5 parts of vinyl trimethoxysilane (VTMO, Wacker Geniosil XL10), 0.95 parts by weight of 3-aminopropyl trimethoxysilane (AMMO, Wacker Geniosil GF96) and 0.05 parts by weight of dibutyl tin dilaurate (Metatin 740) were introduced in succession into the mixture thus obtained and this solids mixture was intimately mixed for 30 s in a SpeedMixer.

Test Conditions

1% N-aminoethyl-3-aminopropyl trimethoxysilane and 0.2% dibutyl tin dilaurate were added to each of the prepared polymers. The time to form a skin (skin-over time/SOT) and the time to form a tack-free film (tack-free time/TFT) were determined for these mixtures.

The aforementioned mixtures were also applied in a film thickness of 2 mm to glass sheets covered with polyether film. After being stored for 7 days (23° C., 50% relative humidity), specimens (S2 specimens) were punched out and the mechanical data (modulus, elongation, resilience) were determined by reference to DIN EN 27389 and DIN EN 28339.

The results of the curable adhesive/sealant preparations prepared according to the invention are summarized in Table 1 below.

The preparations according to the invention of examples 3 and 4 exhibit a balanced relationship between extensibility (ultimate elongation in %), lower E-modulus at 50 and 100% elongation (E-50 and E-100) and resilience in %. Although the composition according to comparative example 6 has very high resilience, this is at the expense of a very high E-modulus at 50 and 100% elongation. This is undesirable, as this would put a severe strain on an expansion joint. When the crosslink density is adjusted by reducing the proportion of silane groups, it can be seen from comparative example 8 that this results in a very marked reduction in the resilience. Although the preparations of comparative examples 5 and 7, in which silylated polyurethanes were used with incorporation of monofunctional isocyanates, have comparatively favorable mechanical data, their use is undesirable from a health and safety perspective.

|  | Example 3 according to the invention | Example 4 according to the invention | Comparative example 5 |
|---|---|---|---|
| Polymer used from: | Example 1 | Example 2 | Comparative example 1 |
| Viscosity of polymer (mPa) | 33,600 | 129,000 | 67,200 |
| Formulation of preparation: | — | | |
| Results after 7 days | | | |
| SOT (conditioning chamber) | 45 min | 48 min | 24 min |
| TFT (conditioning chamber) | <24 h | <24 h | <24 h |
| Break in N/mm² | 0.55 | 0.48 | 0.67 |
| Elongation in % | 278% | 278% | 361% |
| E-50 N/mm² | 0.12 | 0.10 | 0.17 |
| E-100 N/mm² | 0.25 | 0.21 | 0.31 |
| Cure in mm/24 h | 2.0 | 2.1 | — |
| Resilience in % | 85% | 85% | 80% |

|  | Comparative example 6 | Comparative example 7 | Comparative example 8 |
|---|---|---|---|
| Polymer used from: | Comparative example 2 | Comparative example 3 | Comparative example 4 |
| Viscosity of polymer (mPa) | 67,200 | 92,800 | 33,600 |
| Formulation of preparation: | — | | |
| Results after 7 days | | | |
| SOT (conditioning chamber) | 12 min | 25 min | 28 min |
| TFT (conditioning chamber) | <24 h | <24 h | <24 h |
| Break in N/mm² | 1.00 | 0.59 | 0.51 |
| Elongation in % | 267% | 330% | 285% |
| E-50 N/mm² | 0.38 | 0.16 | 0.14 |
| E-100 N/mm² | 0.54 | 0.29 | 0.26 |
| Cure in mm/24 h | 2.6 | — | — |
| Resilience in % | 95% | 80% | 75-80% |

The invention claimed is:

1. A curable adhesive or sealant composition comprising a silylated polyurethane prepared by
  (A) reacting
    (i) at least one polyol compound having a molecular weight of 4000 to 30,000 g/mol and at least one compound that is monofunctional with regard to isocyanates with
    (ii) at least one diisocyanate, in a stoichiometric excess of the sum of polyol compound(s) and monofunctional compound relative to the diisocyanate compound(s), forming a polyurethane prepolymer which is hydroxyl-terminated; and
  (B) reacting the polyurethane prepolymer with one or more isocyanatosilanes of the formula (I):

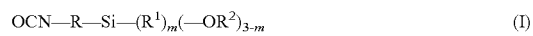

$$\text{OCN—R—Si—}(R^1)_m(\text{—OR}^2)_{3-m} \quad (I)$$

in which m is 0, 1 or 2, each $R^2$ is an alkyl residue having 1 to 4 carbon atoms, each $R^1$ is an alkyl residue having 1 to 4 carbon atoms and R is a difunctional organic group;

the composition having a viscosity of 30,000 mPas to 150,000 mPas.

2. The composition according to claim 1, wherein the compound that is monofunctional with regard to isocyanates is selected from monoalcohols, monomercaptans, monoamines or mixtures thereof.

3. The composition according to claim 1, wherein R is a difunctional straight or branched alkyl residue having 1 to 6 carbon atoms.

4. The composition according to claim 1, wherein m is zero.

5. The composition according to claim 1, wherein m is one.

6. The composition according to claim 1, wherein the proportion of the compound that is monofunctional with regard to isocyanates is 10 to 40 mol % of the mixture of polyol compound(s) and compound that is monofunctional with regard to isocyanates.

7. The composition according to claim 1, wherein the isocyanatosilane is 3-isocyanatopropyltrimethoxysilane or 3-isocyanatopropyltriethoxysilane.

8. The composition according to claim 1, wherein the compound that is monofunctional with regard to isocyanates is selected from monomercaptans, monoamines or mixtures thereof.

9. The composition according to claim 1, wherein the isocyanatosilane of the formula (I) is 3-isocyanatopropyltrimethoxysilane or 3-isocyanatopropyltriethoxysilane and/or the diisocyanate compound is selected from the group consisting of 2,4-toluene diisocyanate, 2,6-toluene diisocyanate, 4,4'-diphenylmethane diisocyanate, 2,4'-diphenylmethane diisocyanate, 1-isocyanato-3,3,5-trimethyl-5-isocyanatomethylcyclohexane (isophorone diisocyanate, IPDI), 4,4'-dicyclohexylmethane diisocyanate isomers, tetramethylxylylene diisocyanate (TMXDI), and mixtures thereof.

10. The curable adhesive or sealant composition of claim 1 having a viscosity of 40,000 to 80,000 mPas.

11. A silane-crosslinking, curable composition squeezable from a tube and containing at least one silylated polyurethane obtained by
(A) reacting
(i) at least one polyol compound having a molecular weight of 4000 to 30,000 g/mol and at least one compound that is monofunctional with regard to isocyanates with
(ii) at least one diisocyanate, in a stoichiometric excess of the sum of polyol compound(s) and monofunctional compound relative to the diisocyanate compound(s), forming a polyurethane prepolymer which is hydroxyl-terminated; and
(B) reacting the polyurethane prepolymer with one or more isocyanatosilanes selected from 3-isocyanatopropyltrimethoxysilane or 3-isocyanatopropyltriethoxysilane and/or the diisocyanate compound is selected from the group consisting of 2,4-toluene diisocyanate, 2,6-toluene diisocyanate, 4,4'-diphenylmethane diisocyanate, 2,4'-diphenylmethane diisocyanate, 1-isocyanato-3,3,5-trimethyl-5-isocyanatomethylcyclohexane (isophorone diisocyanate, IPDI), 4,4'-dicyclohexylmethane diisocyanate isomers, tetramethylxylylene diisocyanate (TMXDI), and mixtures thereof.

12. The silane-crosslinking, curable composition of claim 11 having a viscosity of 40,000 to 80,000 mPas.

* * * * *